(12) United States Patent
Bates et al.

(10) Patent No.: US 11,747,356 B2
(45) Date of Patent: Sep. 5, 2023

(54) SUPPORT ELEMENT FOR A MODULAR TRANSPORT PLANE, MODULAR TRANSPORT PLANE, AND LABORATORY DISTRIBUTION SYSTEM

(71) Applicant: Roche Diagnostics Operations, Inc., Indianapolis, IN (US)

(72) Inventors: Christopher Bates, Tamm (DE); Julian Pfaff, Munich (DE); Noelia Gonzalez Vila, Munich (DE); Adrian Fernandez Vazquez, Munich (DE); Kyle Benton, Randolph, MA (US); Attila Sapi, Budapest (HU)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 324 days.

(21) Appl. No.: 17/128,268

(22) Filed: Dec. 21, 2020

(65) Prior Publication Data
US 2022/0196689 A1 Jun. 23, 2022

(51) Int. Cl.
*G01N 35/04* (2006.01)
*B01L 9/06* (2006.01)

(52) U.S. Cl.
CPC ............... *G01N 35/04* (2013.01); *B01L 9/06* (2013.01); *G01N 2035/0418* (2013.01); *G01N 2035/0477* (2013.01)

(58) Field of Classification Search
CPC ........... G01N 35/04; G01N 2035/0418; G01N 2035/0477; G01N 2035/0406; B01L 9/06
See application file for complete search history.

(56) References Cited

U.S. PATENT DOCUMENTS

| 3,273,727 | A | 9/1966 | Rogers et al. |
| 3,653,485 | A | 4/1972 | Donlon |
| 3,901,656 | A | 8/1975 | Durkos et al. |
| 4,150,666 | A | 4/1979 | Brush |
| 4,395,164 | A | 7/1983 | Beltrop et al. |

(Continued)

FOREIGN PATENT DOCUMENTS

| CN | 201045617 Y | 4/2008 |
| CN | 102109530 A | 6/2011 |

(Continued)

*Primary Examiner* — Lyle Alexander
*Assistant Examiner* — Ali Husain Faraz
(74) *Attorney, Agent, or Firm* — Thomas E. Lees, LLC

(57) ABSTRACT

A support element for a modular transport plane with a plurality of transport module units each comprising a driving surface assembly is presented. The support element has an upper support surface supporting the driving surface assemblies of at least two neighboring transport module units. The upper support surface has driving surface assembly interfaces engaged with complementary interfaces of the supported driving surface assemblies. The support element comprises a lower part having a mounting structure and an upper part having the upper support surface. The upper part connects lengthwise to the lower part via a connection structure. The connection structure restrains a relative movement between the lower part and the upper part in the longitudinal direction of the support element and allows a limited relative movement between the lower part and the upper part in a plane perpendicular to the longitudinal direction of the support element.

13 Claims, 7 Drawing Sheets

(56) References Cited

U.S. PATENT DOCUMENTS

| | | |
|---|---|---|
| 4,544,068 A | 10/1985 | Cohen |
| 4,771,237 A | 9/1988 | Daley |
| 5,120,506 A | 6/1992 | Saito et al. |
| 5,295,570 A | 3/1994 | Grecksch et al. |
| 5,309,049 A | 5/1994 | Kawada et al. |
| 5,457,368 A | 10/1995 | Jacobsen et al. |
| 5,523,131 A | 6/1996 | Isaacs et al. |
| 5,530,345 A | 6/1996 | Murari et al. |
| 5,636,548 A | 6/1997 | Dunn et al. |
| 5,641,054 A | 6/1997 | Mori et al. |
| 5,651,941 A | 7/1997 | Stark et al. |
| 5,720,377 A | 2/1998 | Lapeus et al. |
| 5,735,387 A | 4/1998 | Polaniec et al. |
| 5,788,929 A | 8/1998 | Nesti |
| 6,045,319 A | 4/2000 | Uchida et al. |
| 6,062,398 A | 5/2000 | Thalmayr |
| 6,141,602 A | 10/2000 | Igarashi et al. |
| 6,151,535 A | 11/2000 | Ehlers |
| 6,184,596 B1 | 2/2001 | Ohzeki |
| 6,191,507 B1 | 2/2001 | Peltier et al. |
| 6,206,176 B1 | 3/2001 | Blonigan et al. |
| 6,255,614 B1 | 7/2001 | Yamakawa et al. |
| 6,260,360 B1 | 7/2001 | Wheeler |
| 6,279,728 B1 | 8/2001 | Jung et al. |
| 6,293,750 B1 | 9/2001 | Cohen et al. |
| 6,429,016 B1 | 8/2002 | McNeil |
| 6,444,171 B1 | 9/2002 | Sakazume et al. |
| 6,571,934 B1 | 6/2003 | Thompson et al. |
| 7,028,831 B2 | 4/2006 | Veiner |
| 7,078,082 B2 | 7/2006 | Adams |
| 7,122,158 B2 | 10/2006 | Itoh |
| 7,278,532 B2 | 10/2007 | Martin |
| 7,326,565 B2 | 2/2008 | Yokoi et al. |
| 7,425,305 B2 | 9/2008 | Itoh |
| 7,428,957 B2 | 9/2008 | Schaefer |
| 7,578,383 B2 | 8/2009 | Itoh |
| 7,597,187 B2 | 10/2009 | Bausenwein et al. |
| 7,850,914 B2 | 12/2010 | Veiner et al. |
| 7,858,033 B2 | 12/2010 | Itoh |
| 7,875,254 B2 | 1/2011 | Garton et al. |
| 7,939,484 B1 | 5/2011 | Loeffler et al. |
| 8,240,460 B1 | 8/2012 | Bleau et al. |
| 8,281,888 B2 | 10/2012 | Bergmann |
| 8,502,422 B2 | 8/2013 | Lykkegaard |
| 8,796,186 B2 | 8/2014 | Shirazi |
| 8,833,544 B2 | 9/2014 | Stoeckle et al. |
| 8,973,736 B2 | 3/2015 | Johns et al. |
| 9,056,720 B2 | 6/2015 | Van De Loecht et al. |
| 9,097,691 B2 | 8/2015 | Onizawa et al. |
| 9,187,268 B2 | 11/2015 | Denninger et al. |
| 9,211,543 B2 | 12/2015 | Ohga et al. |
| 9,239,335 B2 | 1/2016 | Heise et al. |
| 9,423,410 B2 | 8/2016 | Buehr |
| 9,423,411 B2 | 8/2016 | Riether |
| 9,567,167 B2 | 2/2017 | Sinz |
| 9,575,086 B2 | 2/2017 | Heise et al. |
| 9,593,970 B2 | 3/2017 | Sinz |
| 9,598,243 B2 | 3/2017 | Denninger et al. |
| 9,618,525 B2 | 4/2017 | Malinowski et al. |
| 9,658,241 B2 | 5/2017 | Riether et al. |
| 9,664,703 B2 | 5/2017 | Heise et al. |
| 9,772,342 B2 | 9/2017 | Riether |
| 9,791,468 B2 | 10/2017 | Riether et al. |
| 9,810,706 B2 | 11/2017 | Riether et al. |
| 9,902,572 B2 | 2/2018 | Mahmudimanesh et al. |
| 9,939,455 B2 | 4/2018 | Schneider et al. |
| 9,952,242 B2 | 4/2018 | Riether |
| 9,969,570 B2 | 5/2018 | Heise et al. |
| 9,989,547 B2 | 6/2018 | Pedain |
| 10,006,927 B2 | 6/2018 | Sinz et al. |
| 10,012,666 B2 | 7/2018 | Riether |
| 10,031,150 B2 | 7/2018 | Heise et al. |
| 10,094,843 B2 | 10/2018 | Malinowski et al. |
| 10,119,982 B2 | 11/2018 | Baer |
| 10,126,317 B2 | 11/2018 | Heise et al. |
| 10,160,609 B2 | 12/2018 | Malinowski |
| 10,175,259 B2 | 1/2019 | Riether |
| 10,197,586 B2 | 2/2019 | Sinz et al. |
| 10,239,708 B2 | 3/2019 | Sinz |
| 10,261,103 B2 | 4/2019 | Pedain |
| 10,288,634 B2 | 5/2019 | Kaeppeli |
| 10,352,953 B2 | 7/2019 | Huber et al. |
| 10,416,183 B2 | 9/2019 | Hassan |
| 10,450,151 B2 | 10/2019 | Heise et al. |
| 10,495,657 B2 | 12/2019 | Malinowski |
| 10,509,049 B2 | 12/2019 | Sinz et al. |
| 2002/0009391 A1 | 1/2002 | Marquiss et al. |
| 2003/0092185 A1 | 5/2003 | Qureshi et al. |
| 2004/0050836 A1 | 3/2004 | Nesbitt et al. |
| 2004/0084531 A1 | 5/2004 | Itoh |
| 2005/0061622 A1 | 3/2005 | Martin |
| 2005/0109580 A1 | 5/2005 | Thompson |
| 2005/0194333 A1 | 9/2005 | Veiner et al. |
| 2005/0196320 A1 | 9/2005 | Veiner et al. |
| 2005/0226770 A1 | 10/2005 | Allen et al. |
| 2005/0242963 A1 | 11/2005 | Oldham et al. |
| 2005/0247790 A1 | 11/2005 | Itoh |
| 2005/0260101 A1 | 11/2005 | Nauck et al. |
| 2005/0271555 A1 | 12/2005 | Itoh |
| 2006/0000296 A1 | 1/2006 | Salter |
| 2006/0047303 A1 | 3/2006 | Ortiz et al. |
| 2006/0219524 A1 | 10/2006 | Kelly et al. |
| 2007/0116611 A1 | 5/2007 | DeMarco |
| 2007/0210090 A1 | 9/2007 | Sixt et al. |
| 2007/0248496 A1 | 10/2007 | Bondioli et al. |
| 2007/0276558 A1 | 11/2007 | Kim |
| 2008/0012511 A1 | 1/2008 | Ono |
| 2008/0029368 A1 | 2/2008 | Komori |
| 2008/0056328 A1 | 3/2008 | Rund et al. |
| 2008/0131961 A1 | 6/2008 | Crees et al. |
| 2009/0004732 A1 | 1/2009 | LaBarre et al. |
| 2009/0022625 A1 | 1/2009 | Lee et al. |
| 2009/0081771 A1 | 3/2009 | Breidford et al. |
| 2009/0128139 A1 | 5/2009 | Drenth et al. |
| 2009/0142844 A1 | 6/2009 | Le Comte |
| 2009/0180931 A1 | 7/2009 | Silbert et al. |
| 2009/0322486 A1 | 12/2009 | Gerstel |
| 2010/0000250 A1 | 1/2010 | Sixt |
| 2010/0152895 A1 | 6/2010 | Dai |
| 2010/0175943 A1 | 7/2010 | Bergmann |
| 2010/0186618 A1 | 7/2010 | King et al. |
| 2010/0255529 A1 | 10/2010 | Cocola et al. |
| 2010/0300831 A1 | 12/2010 | Pedrazzini |
| 2010/0312379 A1 | 12/2010 | Pedrazzini |
| 2011/0050213 A1 | 3/2011 | Furukawa |
| 2011/0124038 A1 | 5/2011 | Bishop et al. |
| 2011/0172128 A1 | 7/2011 | Davies et al. |
| 2011/0186406 A1 | 8/2011 | Kraus et al. |
| 2011/0287447 A1 | 11/2011 | Norderhaug et al. |
| 2012/0037696 A1 | 2/2012 | Lavi |
| 2012/0129673 A1 | 5/2012 | Fukugaki et al. |
| 2012/0178170 A1 | 7/2012 | Van Praet |
| 2012/0211645 A1 | 8/2012 | Tullo et al. |
| 2012/0275885 A1 | 11/2012 | Furrer et al. |
| 2012/0282683 A1 | 11/2012 | Mototsu |
| 2012/0295358 A1 | 11/2012 | Ariff et al. |
| 2012/0310401 A1 | 12/2012 | Shah |
| 2013/0153677 A1 | 6/2013 | Leen et al. |
| 2013/0180824 A1 | 7/2013 | Kleinikkink et al. |
| 2013/0263622 A1 | 10/2013 | Mullen et al. |
| 2013/0322992 A1 | 12/2013 | Pedrazzini |
| 2014/0170023 A1 | 6/2014 | Saito et al. |
| 2014/0234949 A1 | 8/2014 | Wasson et al. |
| 2015/0014125 A1 | 1/2015 | Hecht |
| 2015/0140668 A1 | 5/2015 | Mellars et al. |
| 2015/0166265 A1 | 6/2015 | Pollack et al. |
| 2015/0241457 A1 | 8/2015 | Miller |
| 2015/0273468 A1 | 10/2015 | Croquette et al. |
| 2015/0273691 A1 | 10/2015 | Pollack |
| 2015/0276775 A1 | 10/2015 | Mellars et al. |
| 2016/0003859 A1 | 1/2016 | Wenczel et al. |
| 2016/0025756 A1 | 1/2016 | Pollack et al. |
| 2016/0054341 A1 | 2/2016 | Edelmann |
| 2016/0229565 A1 | 8/2016 | Margner |

(56) References Cited

U.S. PATENT DOCUMENTS

| | | | |
|---|---|---|---|
| 2017/0108522 A1 | 4/2017 | Baer | |
| 2017/0131310 A1 | 5/2017 | Volz et al. | |
| 2017/0168079 A1 | 6/2017 | Sinz | |
| 2017/0248623 A1 | 8/2017 | Kaeppeli et al. | |
| 2017/0248624 A1 | 8/2017 | Kaeppeli et al. | |
| 2017/0363608 A1 | 12/2017 | Sinz | |
| 2018/0067141 A1 | 3/2018 | Mahmudimanesh et al. | |
| 2018/0106821 A1 | 4/2018 | Vollenweider et al. | |
| 2018/0128848 A1 | 5/2018 | Schneider et al. | |
| 2018/0188280 A1 | 7/2018 | Malinowski | |
| 2018/0210000 A1 | 7/2018 | van Mierlo | |
| 2018/0210001 A1 | 7/2018 | Reza | |
| 2018/0224476 A1 | 8/2018 | Birrer et al. | |
| 2018/0340951 A1 | 11/2018 | Kaeppeli | |
| 2018/0340952 A1* | 11/2018 | Kaeppeli | G01N 35/04 |
| 2018/0348244 A1 | 12/2018 | Ren | |
| 2018/0348245 A1 | 12/2018 | Schneider et al. | |
| 2019/0018027 A1 | 1/2019 | Hoehnel | |
| 2019/0076845 A1 | 3/2019 | Huber et al. | |
| 2019/0076846 A1 | 3/2019 | Durco et al. | |
| 2019/0086433 A1 | 3/2019 | Hermann et al. | |
| 2019/0094251 A1 | 3/2019 | Malinowski | |
| 2019/0094252 A1 | 3/2019 | Waser et al. | |
| 2019/0101468 A1 | 4/2019 | Haldar | |
| 2019/0285660 A1 | 9/2019 | Kopp et al. | |
| 2020/0200783 A1 | 6/2020 | Durco | |
| 2020/0400698 A1 | 12/2020 | Hafner et al. | |
| 2022/0196692 A1* | 6/2022 | Bates | G01N 35/04 |

FOREIGN PATENT DOCUMENTS

| | | |
|---|---|---|
| DE | 3909786 A1 | 9/1990 |
| DE | 102012000665 A1 | 8/2012 |
| DE | 102011090044 A1 | 7/2013 |
| EP | 0601213 A1 | 10/1992 |
| EP | 0775650 A1 | 5/1997 |
| EP | 0916406 A2 | 5/1999 |
| EP | 1122194 A1 | 8/2001 |
| EP | 1524525 A1 | 4/2005 |
| EP | 2119643 A1 | 11/2009 |
| EP | 2148117 A1 | 1/2010 |
| EP | 2327646 A1 | 6/2011 |
| EP | 2447701 A2 | 5/2012 |
| EP | 2500871 A1 | 9/2012 |
| EP | 2502675 B1 | 2/2014 |
| EP | 2887071 A1 | 6/2015 |
| EP | 3211430 A1 | 8/2017 |
| FR | 2418319 A1 | 9/1979 |
| GB | 2165515 A | 4/1986 |
| JP | S56-147209 A | 11/1981 |
| JP | 60-223481 A | 11/1985 |
| JP | 61-081323 A | 4/1986 |
| JP | S61-069604 A | 4/1986 |
| JP | S61-094925 A | 5/1986 |
| JP | S61-174031 A | 8/1986 |
| JP | S61-217434 A | 9/1986 |
| JP | S62-100161 A | 5/1987 |
| JP | S63-31918 A | 2/1988 |
| JP | S63-48169 A | 2/1988 |
| JP | S63-82433 U | 5/1988 |
| JP | S63-290101 A | 11/1988 |
| JP | 1148966 A | 6/1989 |
| JP | H01-266860 A | 10/1989 |
| JP | H02-87903 A | 3/1990 |
| JP | 03-112393 A | 5/1991 |
| JP | 03-192013 A | 8/1991 |
| JP | H03-38704 Y2 | 8/1991 |
| JP | H04-127063 A | 4/1992 |
| JP | H05-69350 A | 3/1993 |
| JP | H05-142232 A | 6/1993 |
| JP | H05-180847 A | 7/1993 |
| JP | 06-26808 A | 2/1994 |
| JP | H06-148198 A | 5/1994 |
| JP | 06-156730 A | 6/1994 |
| JP | 06-211306 A | 8/1994 |
| JP | 07-228345 A | 8/1995 |
| JP | 07-236838 A | 9/1995 |
| JP | H07-301637 A | 11/1995 |
| JP | H09-17848 A | 1/1997 |
| JP | H11-083865 A | 3/1999 |
| JP | H11-264828 A | 9/1999 |
| JP | H11-304812 A | 11/1999 |
| JP | H11-326336 A | 11/1999 |
| JP | 2000-105243 A | 4/2000 |
| JP | 2000-105246 A | 4/2000 |
| JP | 2001-124786 A | 5/2001 |
| JP | 2001-240245 A | 9/2001 |
| JP | 2005-001055 A | 1/2005 |
| JP | 2005-249740 A | 9/2005 |
| JP | 2006-106008 A | 4/2006 |
| JP | 2007-309675 A | 11/2007 |
| JP | 2007-314262 A | 12/2007 |
| JP | 2007-322289 A | 12/2007 |
| JP | 2009-036643 A | 2/2009 |
| JP | 2009-062188 A | 3/2009 |
| JP | 2009-145188 A | 7/2009 |
| JP | 2009-300402 A | 12/2009 |
| JP | 2010-243310 A | 10/2010 |
| JP | 2010-271204 A | 12/2010 |
| JP | 2013-172009 A | 2/2013 |
| JP | 2013-190400 A | 9/2013 |
| SU | 685591 A1 | 9/1979 |
| WO | 1996/036437 A1 | 11/1996 |
| WO | 2003/042048 A3 | 5/2003 |
| WO | 2007/024540 A1 | 3/2007 |
| WO | 2008/133708 A1 | 11/2008 |
| WO | 2009/002358 A1 | 12/2008 |
| WO | 2010/042722 A1 | 4/2010 |
| WO | 2012/170636 A1 | 7/2010 |
| WO | 2010/087303 A1 | 8/2010 |
| WO | 2010/129715 A1 | 11/2010 |
| WO | 2012/158520 A1 | 11/2012 |
| WO | 2012/158541 A1 | 11/2012 |
| WO | 2013/152089 A1 | 10/2013 |
| WO | 2013/169778 A1 | 11/2013 |
| WO | 2013/177087 A2 | 11/2013 |
| WO | 2013/177163 A1 | 11/2013 |
| WO | 2014/059134 A1 | 4/2014 |
| WO | 2014/071214 A1 | 5/2014 |
| WO | 2015/104263 A2 | 7/2015 |

\* cited by examiner

SUPPORT ELEMENT FOR A MODULAR TRANSPORT PLANE, MODULAR TRANSPORT PLANE, AND LABORATORY DISTRIBUTION SYSTEM

BACKGROUND

The present disclosure generally relates to a support element for a modular transport plane and to a modular transport plane for a laboratory distribution system.

A laboratory automation system typically comprises a plurality of pre-analytical, analytical and/or post-analytical stations, in which specimens, for example blood, saliva, swab and other specimens taken from human or animal bodies, are processed. For specimen processing and movement, it is generally known to provide various containers, such as test tubes or vials, containing the specimen. The test tubes are also referred to as specimen tubes or sample tubes. In the context of the application, containers such as test tubes or vials for containing specimen are referred to as specimen containers.

For a movement or distribution of specimen containers, laboratory distribution system comprising a transport plane and a plurality of carriers are known. The carriers are configured to retain one or more specimen container in an upright or vertical position, and each comprise at least one magnetically active element such as, for example, at least one permanent magnet. The transport plane is configured to support the carriers on a driving surface and comprises a plurality of electro-magnetic actuators stationary arranged below the driving surface, wherein the electromagnetic actuators can be controlled to move a carrier placed on the driving surface by applying a magnetic force to the carrier.

With these laboratory distribution systems, there can be a need for a support element for the modular transport plane allowing a reliable alignment of neighboring driving surface assemblies even when there is misalignment of a support structure or base plate assemblies and/or thermal expansion.

SUMMARY

According to the present disclosure, A support element for a modular transport plane with a plurality of transport module units is each transport module unit comprising a driving surface assembly. The support element can comprise a lower part having a mounting structure and an upper part having an upper support surface. The upper support surface can be configured to support the driving surface assemblies of at least two neighboring transport module units. The upper support surface can be provided with driving surface assembly interfaces configured to engage with complementary interfaces of the supported driving surface assemblies. The upper part can be connected lengthwise to the lower part via a connection structure. The connection structure can be configured to restrain a relative movement between the lower part and the upper part in the longitudinal direction of the support element and to allow a limited relative movement between the lower part and the upper part in a plane perpendicular to the longitudinal direction of the support element.

Accordingly, it is a feature of the embodiments of the present disclosure to provide a support element for a modular transport plane allowing a reliable alignment of neighboring driving surface assemblies, even with misalignment of a support structure or base plate assemblies and/or thermal expansion. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
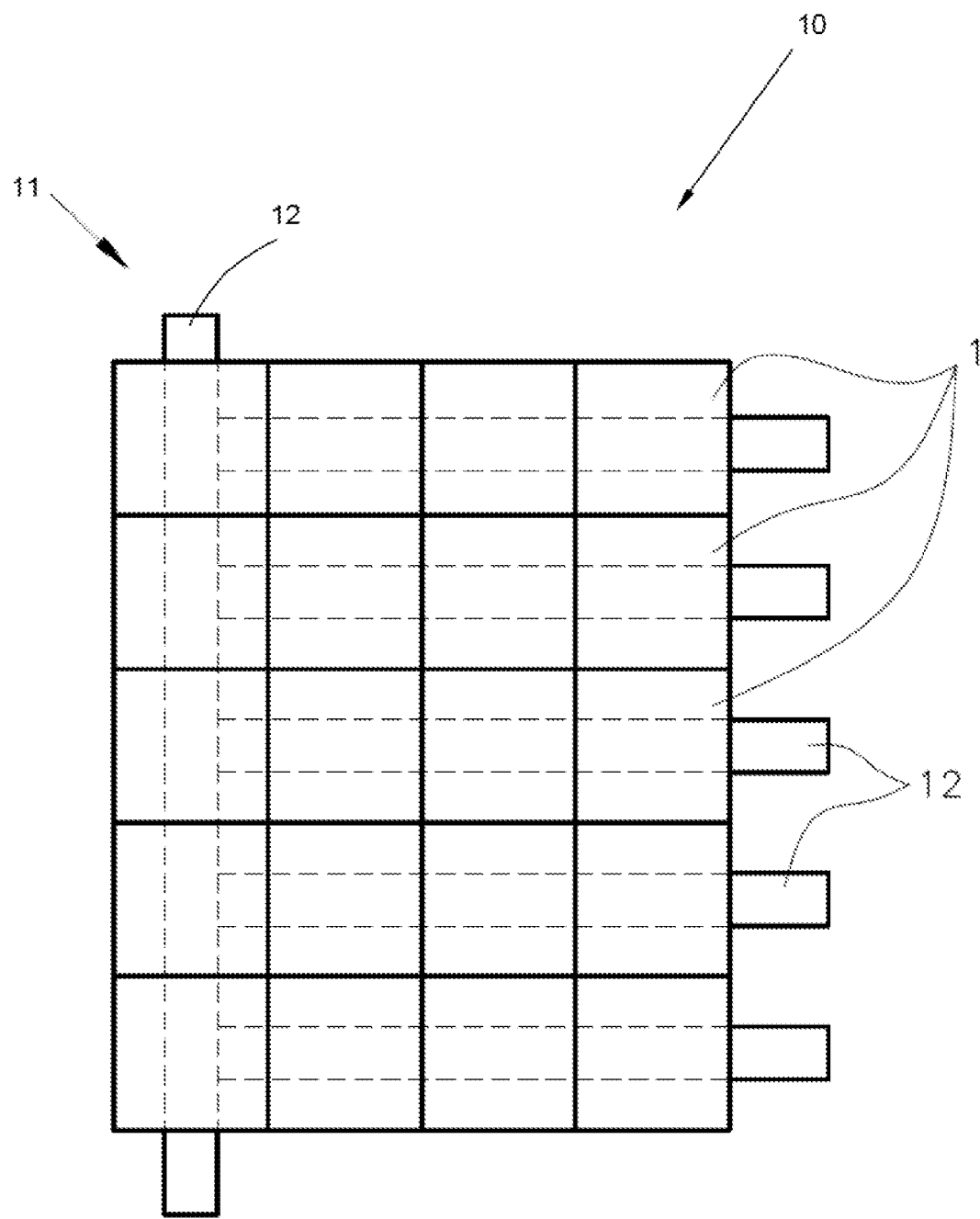
FIG. 1 illustrates a top view of transport plane for a laboratory distribution system build from several transport module units according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A support element for a modular transport plane with a plurality of transport module units is disclosed. Each transport module unit can comprise a driving surface assembly. The support element can comprise a lower part having a mounting structure and an upper part having an upper support surface. The upper support surface can be configured to support the driving surface assemblies of at least two neighboring transport module units. The upper support surface can be provided with driving surface assembly interfaces configured to engage with complementary interfaces of the supported driving surfaces. The upper part can be connected lengthwise to the lower part via a connection structure. The connection structure can be configured to restrain a relative movement between the lower part and the upper part in the longitudinal direction of the support element and to allow a limited relative movement between the lower part and the upper part in a plane substantially perpendicular to the longitudinal direction of the support element.

A driving surface assembly for example can comprise a driving surface, a driving surface support and a sensor board. The sensor board can at least form part of a device for sensing a presence or position of a carrier moved across the upper side of the driving surface. In one embodiment, the driving surface can be transparent to IR light, wherein the sensor board can be equipped with multiple IR based reflection light barriers arranged in a grid, and the carriers can be configured to reflect IR radiation emitted by the light barriers. In other embodiments, the sensor board can be equipped with inductive sensors configured for detecting a position of a carrier moved across the upper side of the driving surface. The transport module unit may further comprise an actuator assembly with back iron, a plurality of coils mounted to the back iron and controller circuit board. The transport module units in embodiments can be mounted above a base plate assembly with cabling for a power supply, cabling for a communication, and a cooling infrastructure.

The support element, more particular, the lower part of the support element, can comprise a mounting structure. In one embodiment, the mounting structure can be configured to mount the lower part to a support frame. In other embodiments, base plate assemblies can be provided and the mounting structure can be configured to mount the lower part to the base plate assemblies.

The upper part can be mounted so as to be moveable with respect to the lower part in a plane substantially perpendicular to the longitudinal direction. In other words, the upper part can be connected in a floating manner to the lower part. This can allow for a limited relative movement between the lower part and the upper part, and, thus, between the lower part and driving surface assemblies supported by the upper support surface and in engagement with the upper part.

Upon installation of a modular transport plane and/or in use, misalignments between base plate assemblies and/or other support structures can be caused, for example, by manufacturing tolerances, assembly tolerances, installation tolerance, and/or thermal expansion or contraction. By providing a multi-part support element, an alignment of driving surface assemblies can be achieved using the upper parts of a set of support elements despite a misalignment between base plate assemblies and/or other support structures engaged with the lower parts of the set of support elements.

Throughout this description and the claims, the indefinite article "a" or "an" can mean "one or more." Reference to "a first element" may not mandate presence of "a second element." Further, the expressions "first" and "second" can only be used to distinguish one element from another element and not to indicate any order of the elements.

The connection structure, in one embodiment, can comprise a pair of interlocking hook and eye elements such as, for example, three or four pairs of interlocking hook and eye elements evenly distributed about a circumference of the support element. The hook element and the eye element of the pair of interlocking hook and eye elements can have contacting cross braces, which can be configured to allow a sliding movement between the hook element and the eye element in at least one direction in a plane substantially perpendicular to the longitudinal direction of the support element.

In the context of the application, a hook element can be defined as a curved or bent element having a free end and which can be configured to interlock with an eye element configured to catch the hook element for restricting a movement in a longitudinal direction. The eye element, in one embodiment, can also be provided with a free end and similar in design to the hook element. In other embodiments, the eye element can be a closed, loop-shaped element. The hook element and the eye element can contact each other in cross braces, in which the cross braces according to an embodiment can be configured to allow a sliding movement between the hook element and the eye element in at least one direction in a plane substantially perpendicular to the longitudinal direction of the support element.

In one embodiment, the hook elements can be formed at the upper part and the eye element can be formed at the lower part. In other embodiments, the hook elements can be formed at the lower part and the eye element can be formed at the upper part.

In one embodiment, in order to allow a relative sliding movement, the hook element and the eye element can each have a cross brace with a flat contact surface. In one embodiment, the cross braces can be arranged substantially perpendicular to one another. In one embodiment, the cross braces can be in the form of bars. An extension of the cross brace of the hook element in its longitudinal direction can be larger than an extension of the cross brace of the eye element substantially perpendicular to the longitudinal direction. Likewise, an extension of the cross brace of the eye element in its longitudinal direction can be larger than an extension of the cross brace of the hook element substantially perpendicular to the longitudinal direction. This can allow a relative movement between the hook element and the eye element along the longitudinal directions of the two cross braces, and, thus, a relative movement between the lower part and the upper part in a plane substantially perpendicular to the longitudinal direction of the support element.

In order to limit a relative movement and to secure a connection between the hook element and the eye element, in one embodiment, the cross brace of the hook element can be provided with a lock pawl at its free end.

In one embodiment, the connection structure can comprise one pair of hook and eye elements, which can be arranged at a centerline of the support element. In order to provide a more stable connection, in other embodiments, the connection structure can comprise four pairs of interlocking hook and eye elements. In one embodiment, the cross braces of the hook elements can be arranged at four sides of a virtual square with a common orientation in a circumferential direction of the virtual square. This arrangement can allow a connection of the upper part with the lower part by twisting the upper part about a centerline.

As mentioned above, in one embodiment, the transport module unit can further comprise an actuator assembly with a back iron. In one embodiment, the actuator assembly can be supported by a base plate assembly arranged below the actuator assembly. In alternative or in addition, in one embodiment, the upper part of the support element can be provided with a back iron interface configured to interlock with back irons of actuator assemblies of two neighboring transport module units.

The back iron interface, in one embodiment, can comprise two opposing force application surfaces. Each force application surface can be configured to interlock with the back iron of one of the actuator assemblies of the two neighboring transport module units such that a relative movement of neighboring transport module units away from each other can be restrained and, in response to a restrained relative movement, forces can be transmitted via the back irons and the force application surfaces. The force transmission can allow for a distribution of the relative movement over the modular transport plane.

In order to avoid liquid accidently spilled on the upper surface of the driving surface assembly to enter the transport module unit, in one embodiment, the upper part can be provided with a central cavity for liquid collection.

In one embodiment, the support element can be arranged at side-to-side junctions between exactly two neighboring transport module units. In other embodiments, the support element can be a corner support element. The upper support surface can be provided with up to three, four or six driving surface assembly interfaces configured to engage with complementary interfaces of the supported driving surface assemblies having a substantially hexagonal, square or triangular basic shape, respectively. Corner support elements can allow a stable support of transport module units and a precise alignment of neighboring transport module units with a minimum number of support elements.

In one embodiment, the mounting structure of the lower part can be provided with up to three, four or six base plate assembly interfaces configured to engage with complementary interfaces at corner regions of base plate assemblies having a substantially hexagonal, square or triangular basic shape, respectively. In one embodiment, the transport module unit can further comprise a base plate assembly. In other embodiments, base plate assemblies can be provided below each transport module unit comprising an actuator module and a driving surface module. In both cases, the number of base plate assemblies supported by one support element can be the same as the number of driving surface assemblies supported by the support element. However, embodiments are conceivable in which base plate assemblies and driving surface assemblies are not provided on a one by one basis.

In one embodiment, each base plate assembly interface can comprise a guiding pin or a guiding recess configured to engage with a guiding recess or guiding pin of a base plate assembly, respectively, wherein the mounting structure can further comprise a plurality of legs arranged between the guiding pins or guiding recesses, each leg having an upward facing engagement surface for a snap-fit connection with complementary snap-on elements of the base plate assemblies of two neighboring transport module units. At the base plate assembly, the guiding pins or guiding recesses can be, in one embodiment, arranged along angle bisectors at the corner regions, wherein the snap-on elements can be arranged symmetrically at either side of the guiding pin or guiding recess.

In one embodiment, the lower part can be provided with a central body. A lower end of the central body can be configured to compress seals of base plate assemblies the interfaces of which can be engaged with base plate assembly interfaces of the lower part. The seal, in one embodiment, can be configured to seal an interior of the base plate assembly airtight against the environment for an air recirculation within the interior. By compressing the seal using the support element such as, for example, a support element in the form of a corner support element, a seal extending between base plate assemblies can act as a plug and a sealing effect can be improved.

A modular transport plane with a plurality of transport module units is also disclosed. Each transport module unit can comprise a driving surface assembly and with a number of multi-part support elements can be provided.

A laboratory distribution system with a modular transport plane and a plurality of carriers can be provided. The carriers can each comprise at least one magnetically active device such as, for example, at least one permanent magnet, and can be configured to carry a specimen container.

A laboratory automation system with a plurality of pre-analytical, analytical and/or post-analytical stations and with a laboratory distribution system can also be provided.

Referring initially to FIG. 1, FIG. 1 schematically shows a top view of an embodiment of a modular transport plane 10 build from several, and in the embodiment shown, twenty transport module units 1. The transport module units 1 can be connected to an infrastructure system 11 comprising support struts 12. Each of the transport module units 1 shown can have a square basic shape allowing building of transport planes 10 of various designs by adding additional transport module units 1 at either side of already existing units 1 and/or removing transport module units 1 from the transport plane 10 shown in FIG. 1. In other embodiments, the transport module units can have a different basic shape, for example, a triangular basic shape or a hexagonal basic shape. Preferably, all transport module units 1 have the same basic shape, wherein the shape can be a tessellating shape. However, in specific embodiments, a transport device can be composed of transport module units 1 having different basic shapes.

Figure 2:
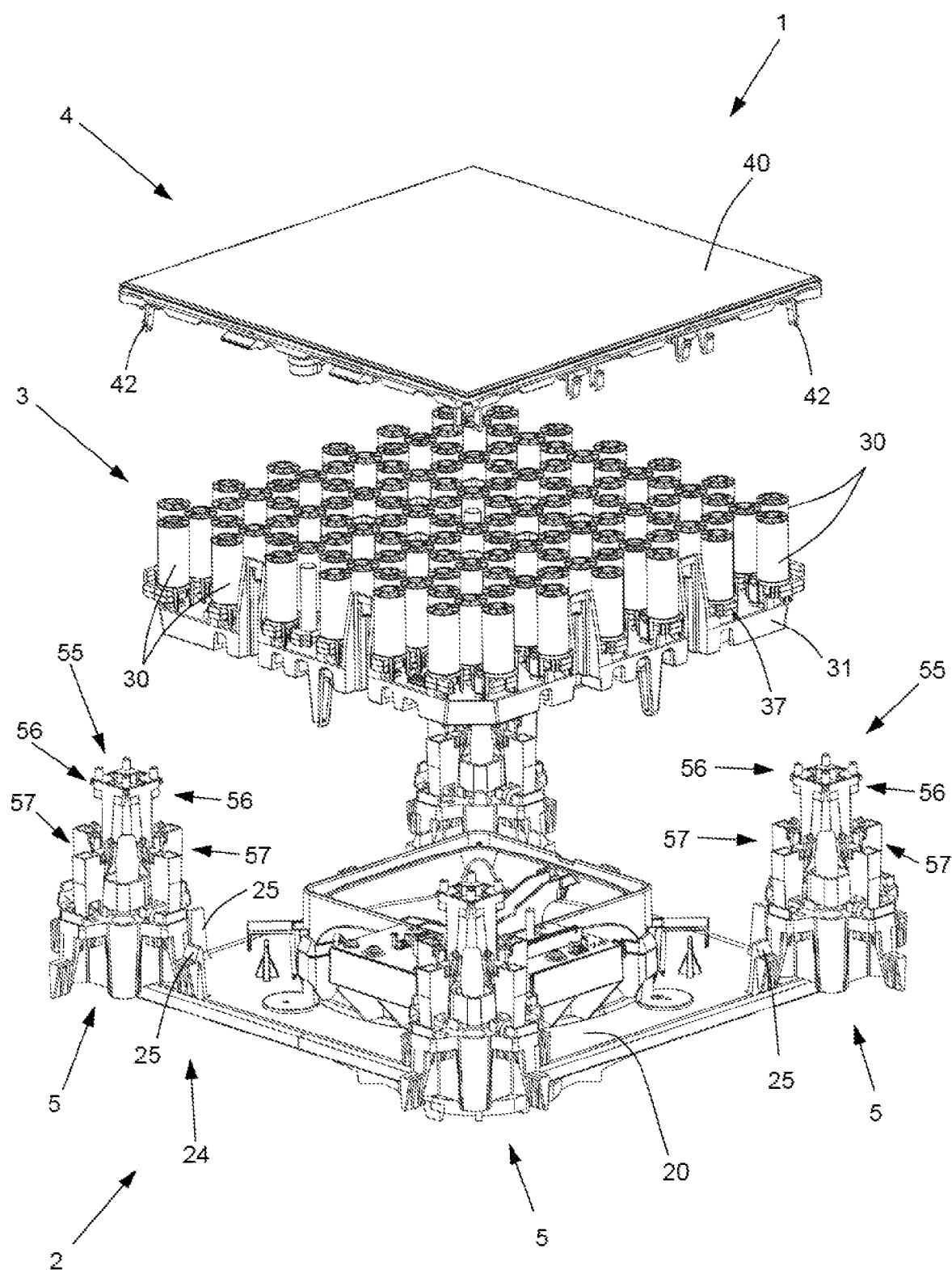
FIG. 2 illustrates an exploded view of a transport module unit according to an embodiment of the present disclosure.

FIG. 2 shows a transport module unit 1, a base plate assembly 2, and support elements for building a transport plane 10 of FIG. 1 in an exploded view. The transport module unit 1 shown in FIG. 2 can comprise two assemblies, namely an actuator assembly 3 and a driving surface assembly 4. The actuator assembly 3 can comprise a plurality of electro-magnetic actuators 30 mounted to a back iron 37, wherein the back iron 37 can be supported by a handle protection 31. The driving surface assembly 4 can comprise a driving surface 40, a driving surface support with an interface 42, and a sensor board (not visible). In the embodiment shown, the transport module units 1 can be provided on a one-by-one with base plate assemblies 2, which can be located underneath the transport module units 1 and configured for connecting the transport module unit 1 to the support struts 12 (see FIG. 1).

Adjacent transport module units 1 can be connected by support elements. In the embodiment shown, the support elements can be in the form of corner support elements 5 connecting corner regions of up to four neighboring transport module units 1. In an alternative embodiment, in which the transport module units have a triangular basic shape or a hexagonal basic shape, the corner support elements can be designed to support the corner regions of up to six or up to three neighboring transport module units, respectively. In alternative or in addition, in still another embodiment, support elements connecting neighboring transport module units 1 at the side surfaces can be provided.

The base plate assembly 2 shown can comprise a base plate 20 having an essentially square basic shape with four sides and four corners. The corner support elements 5 can be provided with a mounting structure for mounting the corner support elements 5 to the corners of the base plates 20 of neighboring base plate assemblies 2, wherein the base plates 20 can be aligned by the corner support elements 5. The corner support elements 5 can be further provided with an upper support surface 55 having a driving surface assembly interface 56 configured to engage with complementary interfaces 42 of the supported driving surface assemblies 4. In other words, in the embodiment shown, the corner support element 5 can function as a connection node for up to four base plate assemblies 2 and for up to four driving surface assemblies 4. Further, the corner supports 5 can be provided with back iron interfaces 57. The back iron interfaces 57, the mounting structure, and the upper support surface 55 will be described in more detail below.

Figure 3:
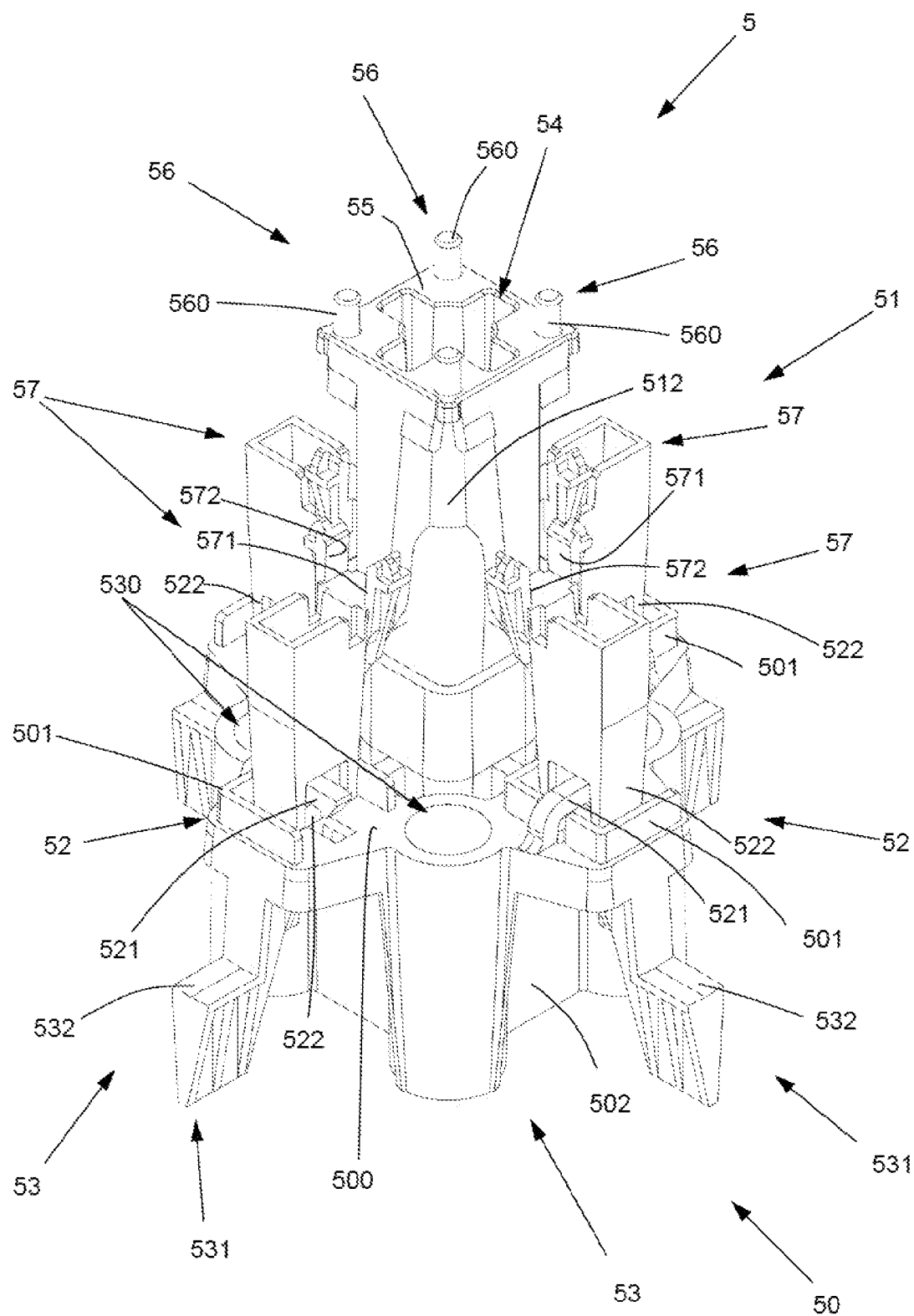
FIG. 3 illustrates a perspective view of a corner support element for connecting neighboring transport module unit according to an embodiment of the present disclosure.
Figure 4:
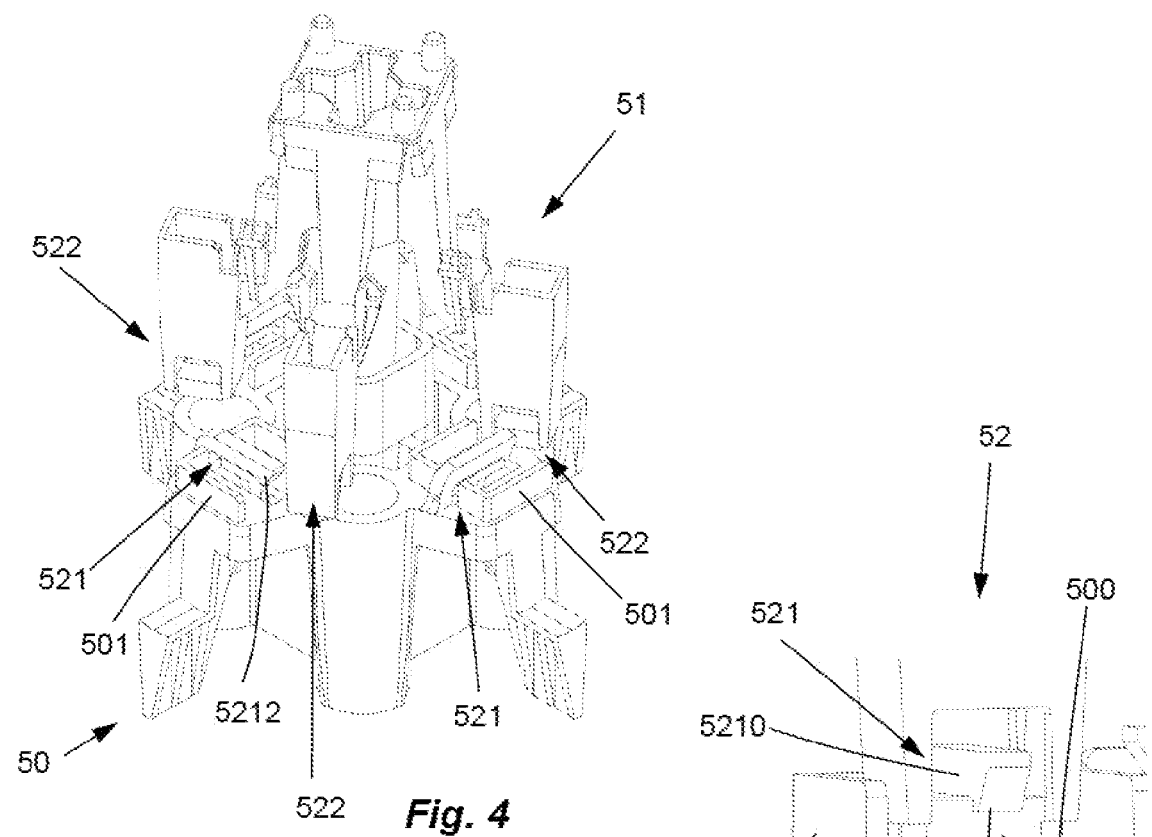
FIG. 4 illustrates a perspective view of the corner support element of FIG. 3 upon installation according to an embodiment of the present disclosure.
Figure 5:
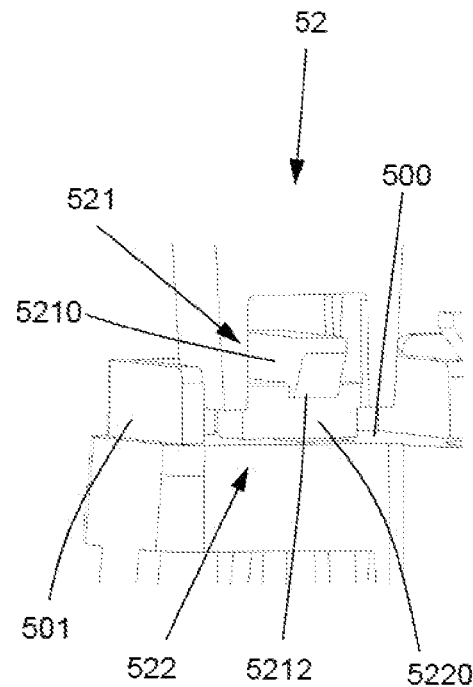
FIG. 5 illustrates a detail of the corner support element of FIG. 3 according to an embodiment of the present disclosure.

A corner support element 5 is shown in isolation in FIG. 3. FIG. 4 is a perspective view of the corner support element 5 upon assembly. FIG. 5 is a detail of the corner support element of FIG. 3 on a larger scale.

The corner support element 5 shown can be a two-part element and can comprise a lower part 50 and an upper part 51, which upper part 51 can be connected lengthwise to the lower part 50 via a connection structure 52. The connection structure 52 can be such that the upper part 51 can be connected in a floating manner to the lower part 50. This can allow a relative movement between base plate assemblies 2 and driving surface assemblies 4 connected to the corner support element 5 in a horizontal plane.

The connection structure 52 shown in FIGS. 3 to 5 can comprise four pairs of interlocking hook and eye elements. In the embodiment shown, four hook elements 521 (only two visible in FIG. 3) can be provided on a top surface 500 of the lower part 50, and four eye elements 522 can be provided at a bottom surface of the upper part 51.

The connection structure 52 comprising the hook element 521 and the eye element 522 can restrain a relative movement between the lower part 50 and the upper part 51 in the longitudinal direction of the corner support element 5 and can permit a limited relative movement between the lower part 50 and the upper part 51 a plane substantially perpendicular to the longitudinal direction of the corner support element 5.

As best seen in FIG. 5, the hook element 521 and the eye element 522 can be provided with contacting cross brackets 5210, 5220. The hook element 521 can protrude from the top surface 500 of the lower part 50, wherein the cross bracket 5210 can be arranged in substantially parallel to the top surface 500 and the cross bracket 5220 of the eye element 522 can enter between the cross bracket 5210 of the hook element 521 and the top surface 500, thereby restricting a movement between the lower part 50 and the upper part 51 in the longitudinal direction of the corner support element 5. At the free ends of the cross brackets 5210, pawls 5212 can be provided. An extension of the cross bracket 5210 of the hook element 521 in its longitudinal direction can be larger than an extension of the cross bracket 5220 of the eye element 522 substantially perpendicular to the longitudinal direction. Likewise, an extension of the cross bracket 5220 of the eye element 522 in its longitudinal direction can be larger than an extension of the cross bracket 5210 of the hook element 521 substantially perpendicular to the longitudinal direction. This can allow a relative movement between the lower part 50 and the upper part 51 along the longitudinal directions of the two cross brackets 5210, 5220. The relative movement can be limited by dimensioning of the cross brackets 5210, 5220. In addition, U-shaped rims 501 protruding from the top surface 500 can be provided, wherein each rim 501 partly can surround one hook element 521 at its two side faces and at its end opposite to its free end. The rim 501 can also limit a movement of the eye element 522 with respect to the hook element 521, thereby avoiding high bending forces on the hook element 521 upon a relative movement in the direction of the cross bracket 5220 of the eye element 522.

As shown in FIG. 3, the cross brackets 5210 of the hook elements 521 can be arranged along four sides of a virtual square with a common orientation in a circumferential direction of the corner support element 5. The cross brackets 5220 of the eye elements 522 can be arranged substantially perpendicular to the four sides of the virtual square. As shown in FIG. 4, for connecting the upper part 51 to the lower part 50, the hook elements 521 can be threaded into the eye elements 522 by twisting the upper part 51 with respect to the lower part 50 as schematically indicated by an arrow.

Figure 6:
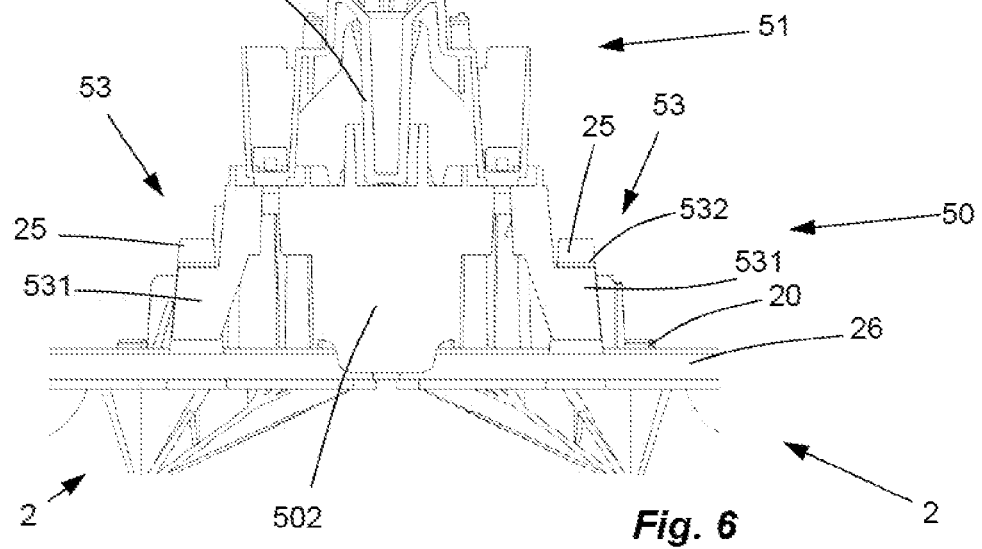
FIG. 6 illustrates a sectional view of the corner support element of FIG. 3 together with corner regions of two base plate assemblies according to an embodiment of the present disclosure.

FIG. 6 is a sectional view of the corner support element 5 together with corner regions of two base plate assemblies 2. As shown in FIG. 6, the lower part 50 of the corner support 5 can have a central body 502 and the upper part 51 of the corner support 5 can have a central body 512, wherein a lower end of the central body 512 of the upper part 51 can be rotatable and with play received in recess of the central body 502 of the lower part 50.

It can be apparent to the person skilled in the art that other embodiments are conceivable, wherein, for example, hook elements can be provided on the upper part, or wherein interlocking eye elements having free ends instead of closed loops can be provided.

As shown in FIGS. 3 and 6, the lower part 50 can be provided with the mounting structure, which in the embodiment shown can comprise four base plate assembly interfaces 53 configured to engage with complementary interfaces 24 (see FIG. 2) at corner regions of base plate assemblies 2 having a rectangular such as, for example, a square basic shape.

In the embodiment shown, at corner regions of each base plate assembly 2, upwardly protruding pins (not visible in the figures) can be provided on virtual diagonal lines of the base plates 20. Further, at each corner region, two snap-on elements 25, arranged symmetrically with regard to the virtual diagonal lines can be provided.

Each base plate assembly interface 53 can comprise a guiding recess 530 configured to receive one guiding pin provided at a corner of a base plate assembly 2 from below. In the embodiment shown, the central body 502 of the lower part 50 can have an essentially square cross section with four corners and four sides and the guiding recesses 530 can be arranged at the four corners of the central body 502. Further, the mounting structure can comprise a plurality of legs 531 protruding from the sides of the central body 502, in the embodiment four legs 531, which can be arranged between the guiding recesses 530. Each leg 531 can have an upward facing engagement surface 532 provided at a wedge-shape end.

As shown in FIG. 6, the legs 531 having the upward facing engagement surfaces 532 can be placed on the base plate 20 of the base plate assembly 2 and can be configured for a snap-fit connection with complementary snap-on elements 25 of the base plate assemblies 2 of two neighboring transport module units 1, wherein in the sectional view shown in FIG. 6, in each case only one snap-on element 25 supported by the respective leg 531 provided in the drawing plane on the left and the right of the corner support element 5 is shown.

As further shown in FIGS. 3 and 6, a lower end of the central body 502 can be configured to compress seals 26 of base plate assemblies 2. When assembled, the corner support element 5 can compress the seals 26 in the corners between base plate assemblies 2 acting as a plug to create a seal in the corners between neighboring base plate assemblies 2. As shown in FIG. 3, the upper support surface 55 having four driving surface assembly interfaces 56 can be provided at the upper part 51. Each driving surface assembly interface 56 can comprise an alignment pin 560.

Figure 7:
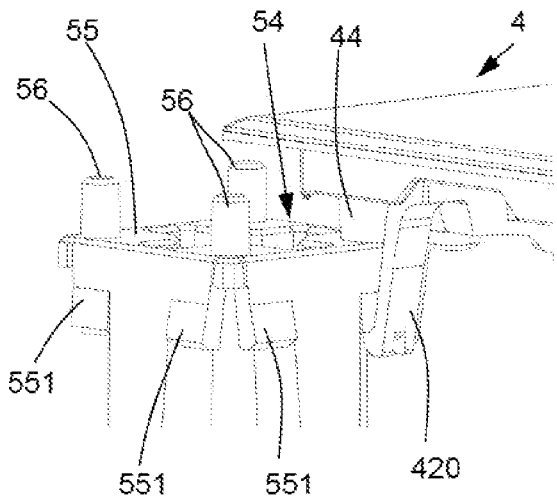
FIG. 7 illustrates a top part of the corner support element of FIG. 3 together with a corner region of one driving surface assembly according to an embodiment of the present disclosure.

FIG. 7 shows the upper support surface 55 of the corner support element 5 having four alignment pins 560 together with a corner region of one driving surface assembly 4. As shown in FIG. 7, each alignment pin 560 can be configured to receive from above an alignment hole 44 provided at a corner of a driving surface assembly 4. Further, below the upper support surface 55, a plurality of protrusions 551 can be provided, which can be configured for a snap-fit connection with complementary snap-on elements 420 of the driving surface assemblies 4.

As shown in FIGS. 3 and 6, the upper part 51 can be provided with a central cavity 54 for liquid collection. The central cavity 54 can be formed in the central body 512 of the upper part 51. The multi-part design of the corner support element 5 can allow a removal of the upper part 51 of the corner support element 5 for discarding the trapped liquid, without the necessity to unmount the base plate assemblies 2 connected by the lower part 50 of the corner support element 5.

Figure 8:
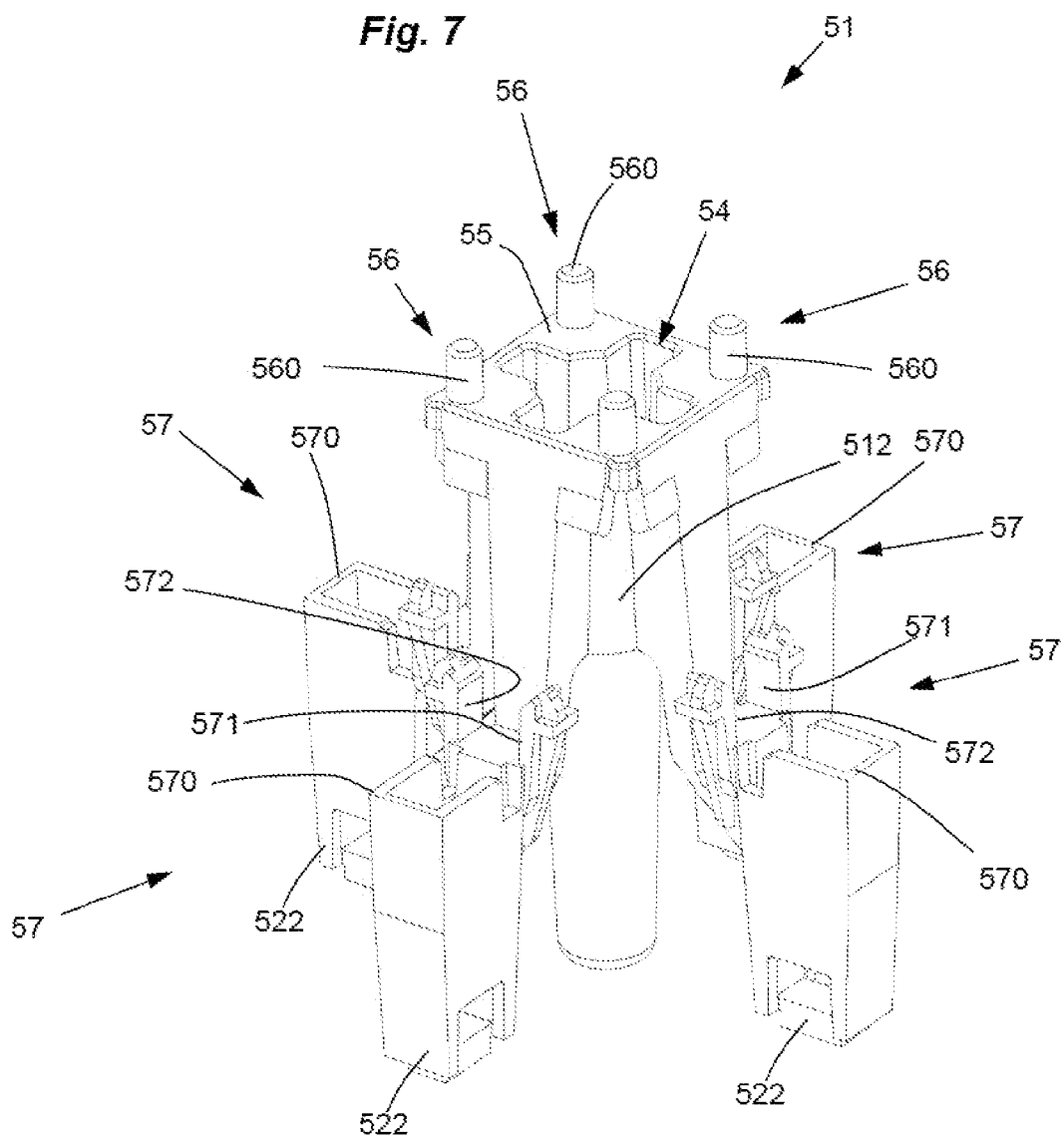
FIG. 8 illustrates an upper part of the corner support element of FIG. 3 in isolation according to an embodiment of the present disclosure.

FIG. 8 shows the upper part 51 of the corner support element 5 in isolation. In the embodiment shown, the corner support element 5 can further be configured to support the back irons 37 (see FIG. 2) of up to four actuator assemblies 3. For this purpose, in the embodiment shown, the upper part 51 of the corner support element 5 can be provided with four back iron interfaces 57. Each back iron interface 57 can comprise a U-shaped support surface 570 configured to support the back irons 37 from below, and two parallel vertical force application surfaces 571, 572 facing each other.

Figure 9:
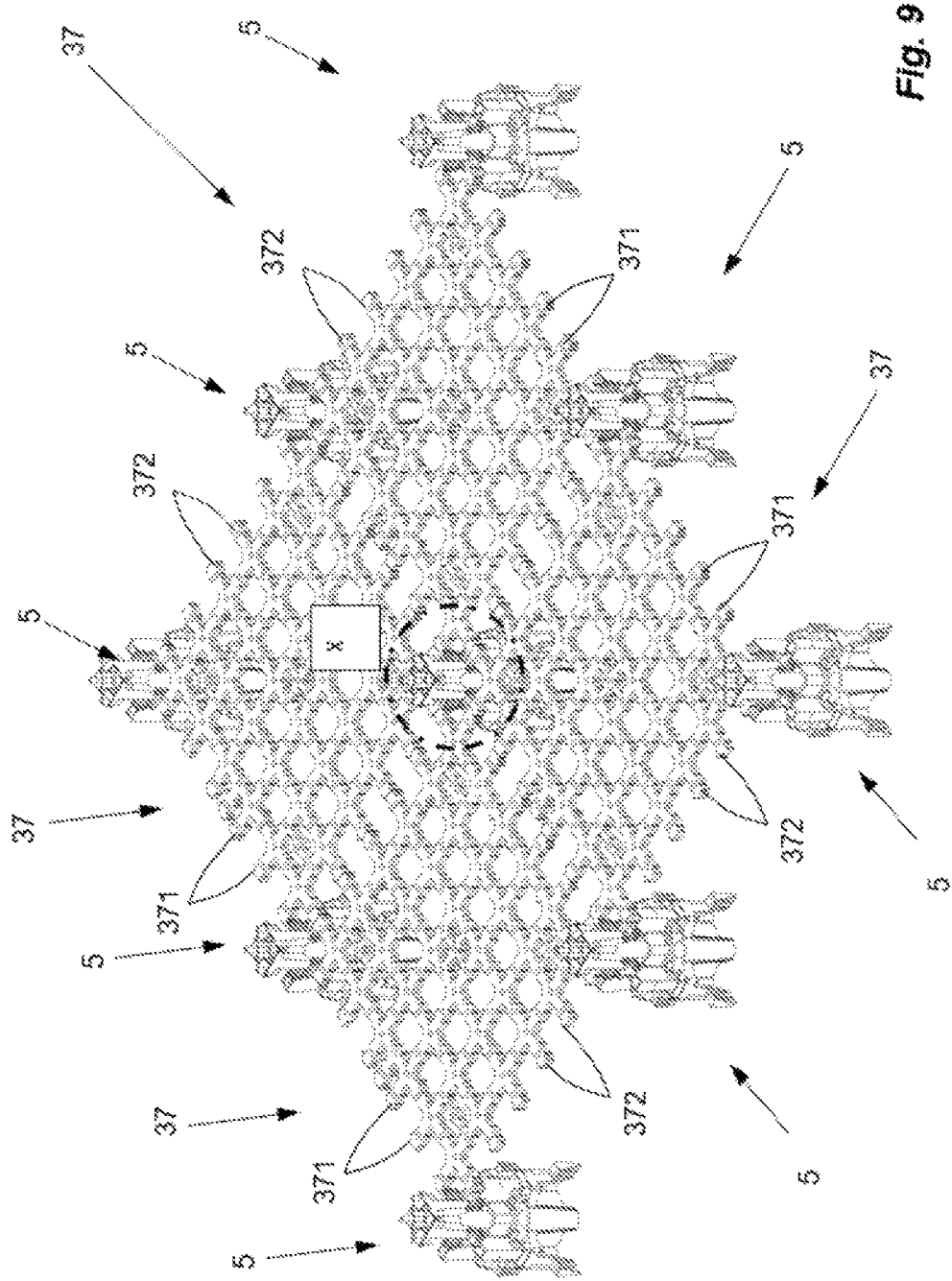
FIG. 9 illustrates a perspective view of four base plate assemblies interconnected by corner support elements and back irons of associated actuator assemblies according to an embodiment of the present disclosure.
Figure 10:
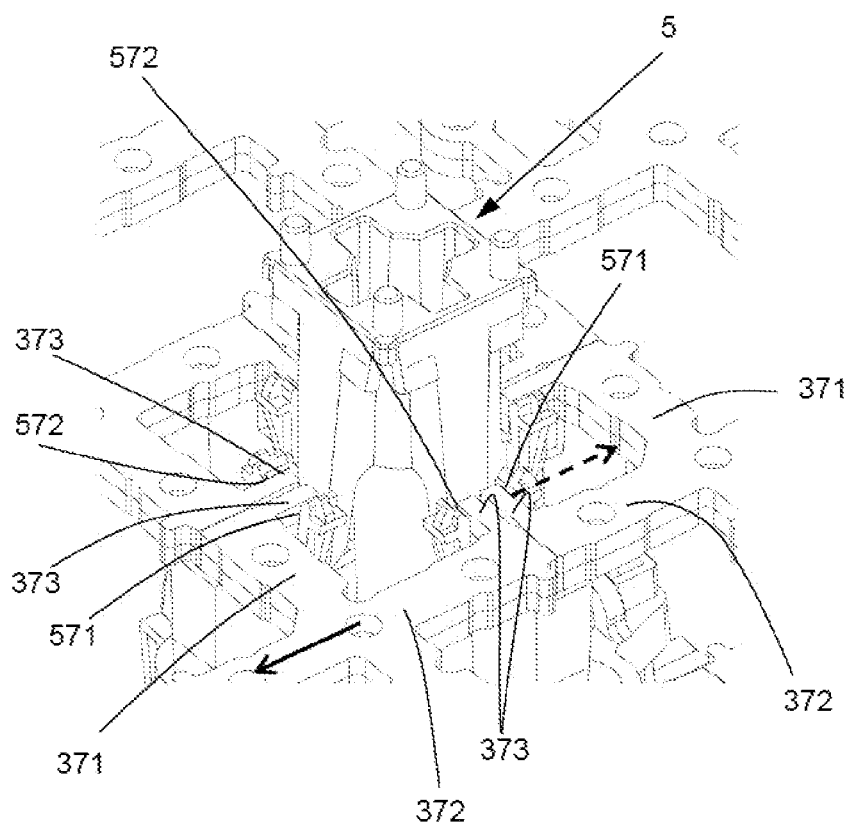
FIG. 10 illustrates a detail X of FIG. 9 showing a force distribution via back irons when moving the transport module units apart from each other according to an embodiment of the present disclosure.
Figure 11:
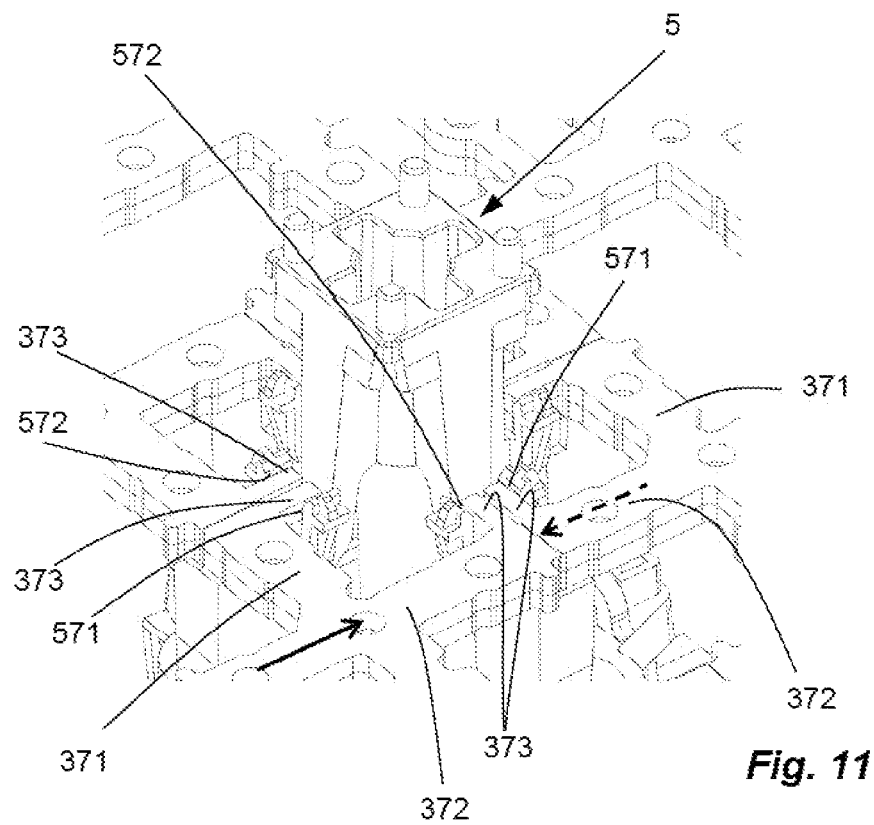
FIG. 11 illustrates a detail X of FIG. 9 showing a force distribution via back irons when moving the transport module units towards each other according to an embodiment of the present disclosure.

FIG. 9 is a perspective view of four back irons 37 of associated actuator assemblies 3 (see FIG. 2), which can be supported by corner support elements 5 and interconnected by the corner support elements 5 for a force transmission. FIGS. 10 and 11 are a detail X of FIG. 9.

As shown in FIG. 9, the back irons 37 can each have a grid structure with intersecting straight elements 371, 372. The straight elements 371, 372 of the back irons 37 of neighboring actuator assemblies 3 can be aligned.

As best seen in FIGS. 10 and 11, free ends of straight elements 371, 372 arranged at sidelines of the grid structure can be provided with pawls 373, extending substantially perpendicular to the longitudinal direction of the respective straight element 371, 372. The pawls 373 can be configured to interlock with the force application surfaces 571, 572, wherein two pawls 373 of neighboring back irons 37 can be received between two opposing force application surfaces 571, 572 of one back iron interface 57. The pawls 373 can be arranged between the force application surfaces 571, 572 leaving a small gap between the two pawls 373 under standard conditions.

When forces are acting on transport module units 1, which can cause one transport module unit 1 to move apart from a neighboring transport module unit 1 as shown by an arrow in FIG. 10, for example due to thermal contraction or thermal extension within the modular transport plane 10, the interlocking connection between force application surfaces 571, 572 and the pawls 373 received between the force application surfaces 571, 572 can cause a force transmission to the back iron 37 of the neighboring transport module unit 1 as schematically shown by a dotted arrow in FIG. 10. The force transmission can cause a chain effect in the modular transport plane 10, wherein by pulling on the back iron 37 of the neighboring transport module unit 1, a relative movement can be distributed in the transport plane 10.

When forces are acting on transport module units 1, which can cause one transport module unit 1 to move closer towards a neighboring transport module unit 1 as shown by an arrow in FIG. 11, for example due to thermal contraction or thermal extension within the modular transport plane 10, the back irons 37 can contact each other, thereby causing a force transmission to the back iron 37 of the neighboring transport module unit 1 as schematically shown by a dotted arrow in FIG. 11. The force transmission can cause a chain effect in the modular transport plane 10, wherein by pushing on the back iron 37 of the neighboring transport module unit 1, a relative movement can be distributed in the transport plane 10.

In embodiments of the present disclosure, all straight elements 371, 372 of neighboring back irons 37 can be arranged with a gap there between, wherein the gaps can be identical in size across the whole length of the back iron 37 such that upon a relative movement of the back irons 37 towards one another all straight elements 371, 372 of neighboring back irons 37 at least can essentially simultaneously come into contact.

For an installation of a modular transport plane 10, first the base plate assemblies 2 can be mounted to support struts 12. Then the lower parts 50 of the corner support elements 5 can be mounted to the corner regions of the base plate assemblies 2 by inserting the guiding pins 241 of up to four neighboring base plate assemblies 2 of a corner junction into the guiding recesses 530 of the base plate assembly interfaces 53 of the lower part 50. At the same time, the wedge-shaped end of the legs 531 can move the snap-on elements 25 of the neighboring base plate assemblies 2 apart and after reaching a final position, the snap-on elements 25 can contact the engagement surfaces 532 of the legs 531 for a snap-fit connection. Next, the upper part 51 can be connected to the lower part 50 by inserting the lower end of a central body 512 of the upper part 51 into a recess of the central body 502 of the lower part 50 and twisting the upper part 51 for threading the hook elements 521 into the eye elements 522. Then, the actuator assemblies 3 can be mounted, wherein pawls 373 provided at corner regions of the back irons 37 of the actuator assemblies 3 can be received between the force application surfaces 571, 572 of the upper parts 51 of the corner support elements 5. Finally, the driving surface assemblies 4 can be mounted by inserting alignment pins 560 of associated corner supports 5 into the alignment holes 44 provided at the corner regions of the driving surface assemblies 4, wherein, in a final position, the snap-on elements 420 of the driving surface assemblies 4 can be in a snap-fit connection with the protrusions 551 protruding below the upper surface 55.

Upon mounting the driving surface assemblies 4, the upper parts 51 of the corner support elements 5 can be moved relative to the lower parts 50 within limits to ensure a good alignment of the driving surface assemblies 4.

It will be apparent to the person skilled in the art, that in an alternative installation procedure the corner support elements 5 can also be pre-assembled before mounting the corner support elements 5 to the base plate assemblies 2.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A support element for a modular transport plane with a plurality of transport module units, each transport module unit comprising a driving surface assembly, the support element comprising:
    a lower part having a mounting structure; and
    an upper part having an upper support surface, wherein the upper support surface is configured to support the driving surface assemblies of at least two neighboring transport module units, wherein the upper support surface is provided with driving surface assembly interfaces configured to engage with complementary interfaces of the supported driving surface assemblies, wherein the upper part is connected lengthwise to the lower part via a connection structure, and wherein the connection structure is configured to restrain a relative movement between the lower part and the upper part in the longitudinal direction of the support element and to allow a limited relative movement between the lower part and the upper part in a plane perpendicular to the longitudinal direction of the support element, wherein the connection structure comprises a pair of interlocking hook and eye elements, wherein the hook element is a curved or bent element having a first cross brace with a flat contact surface extending in a plane perpendicular to the longitudinal direction of the support element, the first cross brace having a free end, wherein the eye element is a closed, loop-shaped element having a second cross brace with a flat contact surface extending in a plane perpendicular to the longitudinal direction of the support element, wherein the first cross brace of the hook element is threaded into the eye element, such that the first cross brace is arranged perpendicular to the second cross brace and the first cross brace contacts the second cross brace for restricting a movement in the longitudinal direction of the support element, and wherein the first cross brace and the second cross brace are dimensioned to allow a sliding movement between the hook element and the eye element in at least one direction in a plane perpendicular to the longitudinal direction of the support element.

2. The support element according to claim 1, wherein the connection structure comprises, three or four pairs of interlocking hook and eye elements evenly distributed about a circumference of the support element.

3. The support element according to claim 1, wherein the first cross brace of the hook element is provided with a lock pawl at its free end.

4. The support element according to claim 1, wherein the connection structure comprises four pairs of interlocking hook and eye elements, wherein the first cross braces of the hook elements are arranged at four sides of a virtual square with a common orientation in a circumferential direction of the virtual square.

5. The support element according to claim 1, wherein the upper part is provided with a central cavity for liquid collection.

6. The support element according to claim 1, wherein the support element is a corner support element, wherein the support surface is provided with up to three, four or six driving surface assembly interfaces comprising an alignment pin configured to engage with alignment holes provided at the corners of the supported driving surface assemblies having a hexagonal, square or triangular basic shape, respectively.

7. The support element according to claim 1, wherein the mounting structure of the lower part is provided with up to three, four or six base plate assembly interfaces comprising a guiding recess configured to receive guiding pins provided at corner regions of base plate assemblies having a hexagonal, square or triangular basic shape, respectively.

8. The support element according to claim 7, wherein the mounting structure further comprises a plurality of legs arranged between the guiding recesses, each leg having an upward facing engagement surface for a snap-fit connection with complementary snap-on elements of the base plate assemblies of two neighboring transport module units.

9. The support element according to claim 7, wherein the lower part has a central body, wherein a lower end of the central body is configured to compress seals of base plate assemblies the guiding pins of which are received in the guiding recesses of the lower part.

10. A modular transport plane with a plurality of transport module units, each transport module unit comprising a driving surface assembly, and with a number of support elements according to claim 1.

11. A laboratory distribution system, the laboratory distribution system comprising:
    a modular transport plane according to claim 10; and a plurality of carriers, the carriers each comprising at least one magnetically active device and configured to carry a specimen container.

12. The laboratory distribution system according to claim 11, wherein the at least one magnetically active device is a permanent magnet.

13. A laboratory automation system, the laboratory automation system comprising:
    a plurality of pre-analytical, analytical and/or post-analytical stations; and a laboratory distribution system according to claim 11.

* * * * *